US011467551B2

(12) United States Patent
Wang et al.

(10) Patent No.: US 11,467,551 B2
(45) Date of Patent: Oct. 11, 2022

(54) POWER ELECTRONICS CONVERTER BASED TRANSFORMER EMULATOR

(71) Applicant: UNIVERSITY OF TENNESSEE RESEARCH FOUNDATION, Knoxville, TN (US)

(72) Inventors: Fei Wang, Knoxville, TN (US); Jingxin Wang, Knoxville, TN (US); Yiwei Ma, Knoxville, TN (US)

(73) Assignee: University of Tennessee Research Foundation, Knoxville, TN (US)

( * ) Notice: Subject to any disclaimer, the term of this patent is extended or adjusted under 35 U.S.C. 154(b) by 0 days.

(21) Appl. No.: 17/150,567

(22) Filed: Jan. 15, 2021

(65) Prior Publication Data
US 2022/0229406 A1 Jul. 21, 2022

(51) Int. Cl.
*G06G 7/48* (2006.01)
*G05B 17/02* (2006.01)
*G06F 30/20* (2020.01)
*G05B 13/04* (2006.01)
*G06F 30/367* (2020.01)

(52) U.S. Cl.
CPC ............ *G05B 17/02* (2013.01); *G05B 13/041* (2013.01); *G06F 30/20* (2020.01); *G06F 30/367* (2020.01); *H02J 2203/20* (2020.01)

(58) Field of Classification Search
CPC ..... G05B 17/02; G05B 13/041; G06F 30/367; H02J 2203/20
See application file for complete search history.

(56) References Cited

U.S. PATENT DOCUMENTS

| 10,873,184 | B2 | 12/2020 | Wang et al. |
| 10,965,124 | B2* | 3/2021 | Laval ........................ H02J 3/32 |
| 2010/0085783 | A1* | 4/2010 | Jiang-Hafner ...... H02M 5/4505 363/35 |
| 2010/0332211 | A1 | 12/2010 | Oudalov et al. |

(Continued)

OTHER PUBLICATIONS

Jimenez et al. Analysis of Reconfigurable Tap Changing Transformer Model Through Analog Emulation IEEE 2009 (Year: 2009).*

(Continued)

*Primary Examiner* — Rehana Perveen
*Assistant Examiner* — Cuong V Luu
(74) *Attorney, Agent, or Firm* — Stanek Lemon Crouse & Meeks, P.A.

(57) ABSTRACT

A transformer emulator includes a DC bus, a first power electronics converter circuit having a DC port coupled to the DC bus, a second power electronics converter circuit having a DC port coupled to the DC bus, and a third power electronics converter circuit having DC port coupled to the DC bus. The transformer emulator includes a control circuit configured to control the first, second and third power electronics converter circuits to emulate a transformer having a first port corresponding to an AC port of the first power electronics converter circuit and a second port corresponding to an AC port of the second power electronics converter circuit. The control circuit is configured to control the first and second power electronics converter circuits to emulate a voltage transformation of the transformer and to control the third power electronics converter circuit to emulate a loss of the transformer.

19 Claims, 6 Drawing Sheets

(56) References Cited

U.S. PATENT DOCUMENTS

2016/0248341 A1* 8/2016 Trainer .................. H02M 1/08
2018/0115164 A1* 4/2018 Gupta ...................... G05F 3/08

OTHER PUBLICATIONS

Wang et al; U.S. Appl. No. 17/150,650 entitled Scalable and Reconfigurable Apparatus and Methods for Electric Power System Emulation; filed Jan. 15, 2021.

* cited by examiner

POWER ELECTRONICS CONVERTER BASED TRANSFORMER EMULATOR

STATEMENT OF GOVERNMENT INTEREST

The invention was made with government support under Award Number EEC-1041877 awarded by the National Science Foundation. The government has certain rights in the invention.

BACKGROUND

The inventive subject matter relates to apparatus and methods for analysis of electrical power systems and, more particularly, to apparatus and methods for emulating electrical power systems.

The design and operation of electrical power systems (e.g., utility grids) commonly involves simulation and/or emulation using tools such as digital simulators, analog hardware emulators, or mixed digital-analog signal emulators. Computer-implemented simulation can provide advantages, such as relatively low cost and reconfigurability, but software-based simulators may have difficulty dealing with multi-timescale models and may suffer from numerical stability and convergence issues. Analog hardware-based emulators can provide advantages such as realism, actual communication and sensors, and that ability to reveal the impact of the aspects that may be overlooked by digital simulation, such as delay, measurement errors, and electromagnetic interference. However, such emulators can be bulky and inflexible and may exhibit model fidelity issues when scaled. Mixed digital-analog signal emulators, such as described in U.S. Patent Application Publication No. 2010/0332211, are more flexible compared to scaled analog hardware-based emulators. However, they also may exhibit model fidelity issues especially with their unscalable line emulation method.

Emulators that utilize power electronics-based converters have been proposed in, for example, U.S. Pat. No. 10,873,184 to Wang et al. Such systems can provide more realistic behavior comparison to digital simulation and may be more flexible than other hardware-based platforms. However, these emulators may have limited flexibility and scalability.

SUMMARY

According to some embodiments, a transformer emulator includes a DC bus, a first power electronics converter circuit having a DC port coupled to the DC bus, a second power electronics converter circuit having a DC port coupled to the DC bus, and a third power electronics converter circuit having DC port coupled to the DC bus. The transformer emulator further includes a control circuit configured to control the first, second and third power electronics converter circuits to emulate a transformer having a first port corresponding to an AC port of the first power electronics converter circuit and a second port corresponding to an AC port of the second power electronics converter circuit. The control circuit is configured to control the first and second power electronics converter circuits to emulate a voltage transformation of the transformer and to control the third power electronics converter circuit to emulate a loss of the transformer. The first and second power converters may include respective voltage source converters (VSCs).

In some embodiments, the control circuit includes a transformer model that generates a current reference for the first power electronics converter and a voltage reference for the second power electronics converter, a current tracker that tracks the current reference for the first power electronics converter, a voltage tracker that tracks the voltage reference for the second power electronics converter, and a voltage tracker that tracks a DC voltage reference for the third power electronics converter.

In some embodiments, the first and second power electronics converter circuits may include respective single-phase power electronics converter circuits or respective multi-phase power electronics converter circuits. Each of the first and second power electronics converter circuits may include a plurality of transistors configured for converting AC power to DC power or DC power to AC power or both.

According to some embodiments, the second power electronics converter circuit may include a plurality of second power electronics converter circuits and the control circuit may be configured to control the first power electronics converter circuit, the plurality of second power electronics converter circuits and the third power electronics converter circuit to emulate a transformer having a first port corresponding to an AC port of the first power electronics converter circuit and a plurality of ports corresponding to the AC ports of the plurality of second power electronics converter circuits. The control circuit may be configured to control the first power electronics converter circuit and the plurality of second power electronics converter circuits to emulate voltage transformations of the transformer and to control the third power electronics converter circuit to emulate a loss of the transformer.

Still further embodiments provide methods of emulating a transformer. The methods include coupling first, second and third power electronics converter circuits to a DC bus and controlling the first, second and third power electronics converter circuits to emulate a transformer having a first port corresponding to an AC port of the first power electronics converter circuit and a second port corresponding to an AC port of the second power electronics converter circuit.

DETAILED DESCRIPTION

Specific exemplary embodiments of the inventive subject matter now will be described with reference to the accompanying drawings. This inventive subject matter may, however, be embodied in many different forms and should not be construed as limited to the embodiments set forth herein; rather, these embodiments are provided so that this disclosure will be thorough and complete, and will fully convey the scope of the inventive subject matter to those skilled in the art. In the drawings, like numbers refer to like items. It will be understood that when an item is referred to as being "connected" or "coupled" to another item, it can be directly connected or coupled to the other item or intervening items may be present. As used herein the term "and/or" includes any and all combinations of one or more of the associated listed items.

The terminology used herein is for the purpose of describing particular embodiments only and is not intended to be limiting of the inventive subject matter. As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, items, and/or components, but do not preclude the presence or addition of one or more other features, integers, steps, operations, items, components, and/or groups thereof.

Unless otherwise defined, all terms (including technical and scientific terms) used herein have the same meaning as commonly understood by one of ordinary skill in the art to which this inventive subject matter belongs. It will be further understood that terms, such as those defined in commonly used dictionaries, should be interpreted as having a meaning that is consistent with their meaning in the context of the specification and the relevant art and will not be interpreted in an idealized or overly formal sense unless expressly so defined herein.

Some embodiments of the inventive subject matter provide power electronics converter based transformer emulators. In some embodiments, such emulators may include first and second power electronics converter circuits (e.g., single or multi-phase voltage source converter circuits) that are interconnected by a DC bus and controlled to emulate a voltage transformation (e.g., scaling and phase shift) provided by the transformer. A third power electronics converter circuit coupled to the DC bus may be used to emulate losses (e.g., ohmic losses, core losses, etc.) of the transformer.

Figure 1:
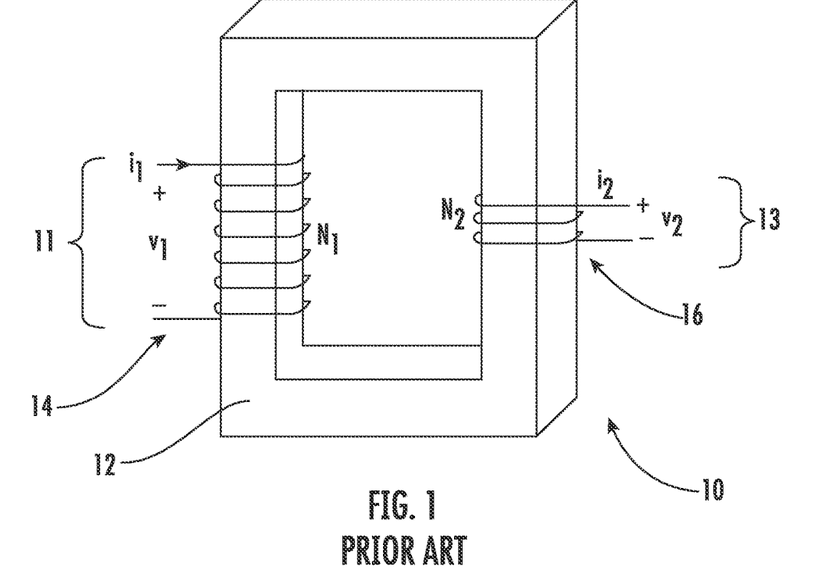
FIG. 1 illustrates a transformer.

FIG. 1 illustrates a conventional transformer 10. The transformer 10 includes a first winding 14 with $N_1$ turns and a second winding 16 with $N_2$ turns on a magnetic core 12. Assuming the first winding 14 is a primary winding and the second winding 16 is a secondary winding, current $i_1$ flowing in the first winding 14 induces a corresponding current $i_2$ in the second winding 16 and provides a voltage transformation $v_2/v_1$, which may include a scaling and/or a phase shift.

Figure 2:
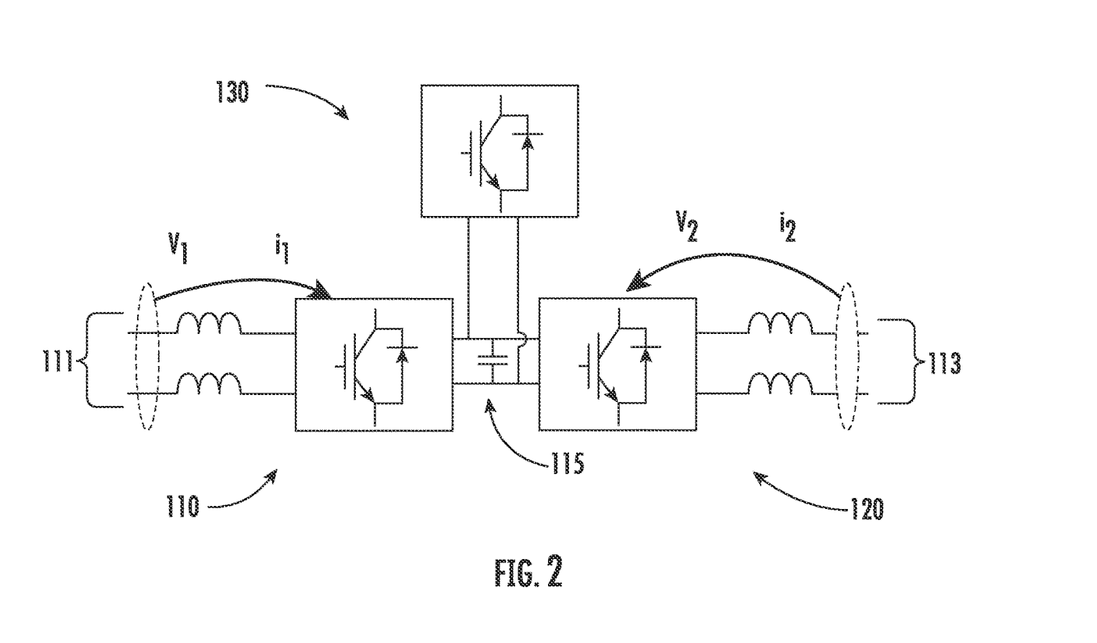
FIG. 2 is a schematic diagram illustrating a power electronics converter based transformer emulator circuit for emulating the transformer of FIG. 1 according to some embodiments.

Referring to FIG. 2, an emulator for the transformer 10 of FIG. 1 according to some embodiments includes a first power electronics converter circuit 110 and a second power converter circuit 120, coupled by a DC bus 115. The first and second power electronics converter circuits 110, 120 are operated to emulate the voltage transformation $v_2/v_1$ between first and second ports 11, 13 of the transformer 10, e.g., such that the voltage transformation $v_2/v_1$ between first and second ports 111, 113 of the emulator is substantially the same as that provided by the transformer. The port voltages $v_1$, $v_2$ and currents $i_1$, $i_2$ can be appropriately scaled with respect to the port voltages $v_1$, $v_2$ and the currents $i_1$, $i_2$ of the transformer 10 to enable use of power electronics converter circuitry with relatively low voltage and current capabilities. The first, second and third power electronics converters 110, 120, 130 may take any of a number of different forms. For example, the first and second power electronics converters 110, 120 may be single-phase or multi-phase converters. The first and second converters 110, 120 may be, for example, two-level or multi-level converters. A third power electronics converter circuit 130 is coupled to the DC bus 115 and can be operated to emulate losses associated with the transformer 10. The loss can be emulated by maintaining constant voltage at the DC bus 115 controlled by the third power electronics converter 130.

Figure 3:
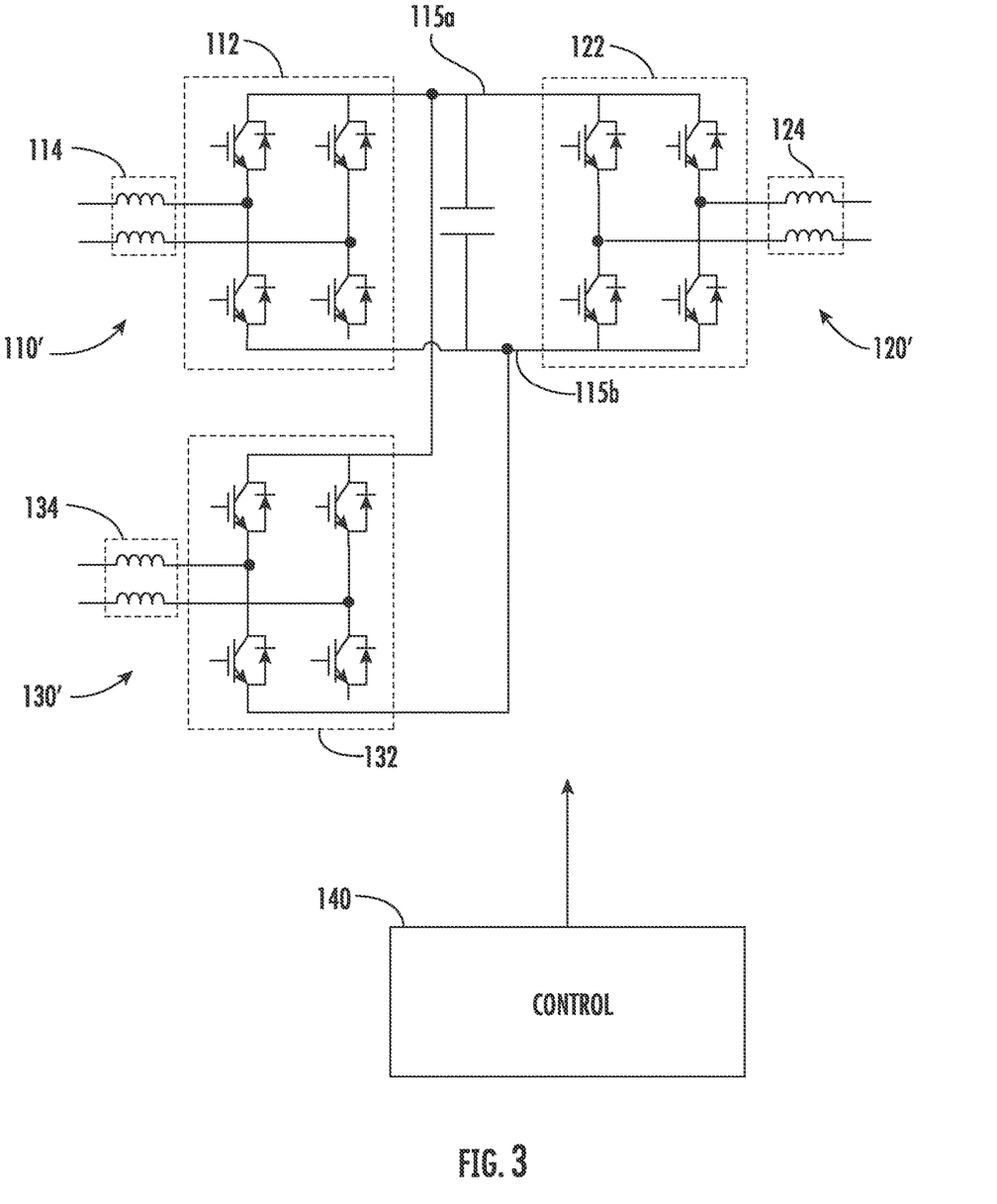
FIG. 3 is a schematic diagram illustrating an implementation of the power electronics converter based transformer emulator circuit FIG. 2 according to some embodiments.

FIG. 3 illustrates an exemplary implementation of the emulator illustrated in FIG. 2. A first converter 110' includes a first full-bridge circuit 112 comprising transistors (e.g., IGBTs, MOSFETs or the like) coupled in series/parallel between first and second DC buses 115a, 115b, and a first filter 114 coupled to the first full-bridge circuit 112. A second converter 120' includes a second full-bridge circuit 122 coupled to the first and second DC buses 115a, 115b, and a second filter 124 coupled to the second full-bridge circuit 122. A third converter 130' circuit includes a third full-bridge circuit 132 coupled to the first and second DC buses 115a, 115b, and a third filter 134 coupled to the third full-bridge circuit 132. It will be appreciated that first converter circuit 110', the second converter circuit 120', and the third converter circuit 130' may correspond to single-phase converters or may correspond to part of a multi-phase converter. It will be appreciated that the converter topology shown in FIG. 3 is provided for purposes of illustration, and that other converter topologies, such as multilevel converter topologies, may be used.

A control circuit 140 is configured to control the first, second and third power converter circuits 110', 120', 130'. The control circuit 140 may generally be implemented using any of a variety of different types of digital and/or analog circuitry, including, but not limited to microprocessor or microcontroller based circuitry that controls the first, second and third power electronics converter circuits 110', 120', 130' based on software instructions executed therein. The control circuit 140 can be configured to provide software configurability of the operations of the first, second and third power electronics converter circuits 110', 120', 130' as desired to implement different emulator performance characteristics using, for example, a control architecture along the lines described below with reference to FIG. 4. The control circuit 140 may also include, for example, user interface circuitry (e.g., circuitry to interface with devices such as displays, keyboards and other user interface devices) to facilitate such configurability and to support, for example, extraction, storage and processing of data, such as data relating to states (e.g., voltage and current) of the emulator apparatus, for analytical and other uses.

Figure 4:
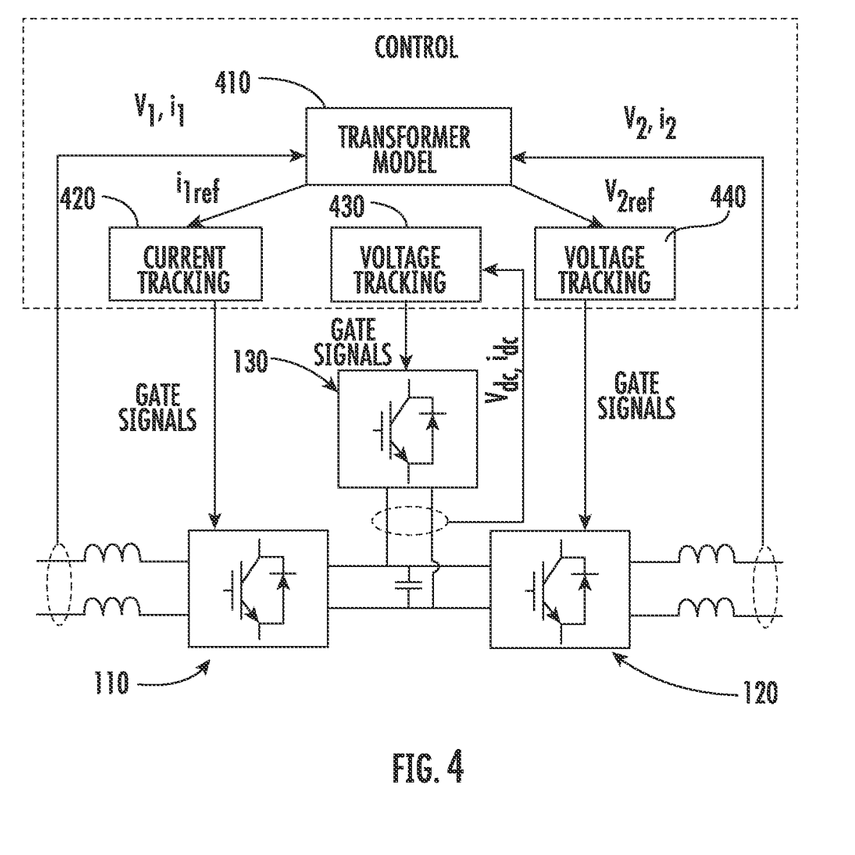
FIG. 4 is a schematic diagram illustrating a control architecture for the power electronics converter based transformer emulator circuit of FIG. 2 according to some embodiments.

FIG. 4 illustrates a control architecture that may be used for the emulator illustrated in FIG. 2. Voltages $v_1$, $v_2$ and currents $i_1$ and $i_2$ at the ports of the first and second converter circuits 110, 120 are input to a transformer model 410, which generates a voltage reference $v_{2ref}$ and a current reference $i_{1ref}$. A current tracker 420 controls the first power electronics converter 110 to track the current reference $i_{1ref}$. A first voltage tracker 440 controls the second power electronics converter 120 to track the voltage reference $v_{2ref}$. A second voltage tracker 430 controls a current $i_{dc}$ drawn from or supplied by the third power electronics converter 130 to regulate a DC voltage $v_{dc}$ on the DC bus 115 voltage to provide loss emulation. The transformer model 410 may take the form of a linear model:

$$\begin{bmatrix} \frac{di_1}{dt} \\ \frac{di_2}{dt} \end{bmatrix} = \begin{bmatrix} L_{11} & L_{12} \\ L_{21} & L_{22} \end{bmatrix}^{-1} \begin{bmatrix} v_1 \\ v_2 \end{bmatrix} - \begin{bmatrix} L_{11} & L_{12} \\ L_{21} & L_{22} \end{bmatrix}^{-1} \begin{bmatrix} R_1 & 0 \\ 0 & R_2 \end{bmatrix} \begin{bmatrix} i_1 \\ i_2 \end{bmatrix},$$

where $L_{11}$, $L_{12}$, $L_{21}$, and $L_{22}$ are the winding leakage inductances, $R_1$ and $R_2$ are the winding resistance.

Figure 5:
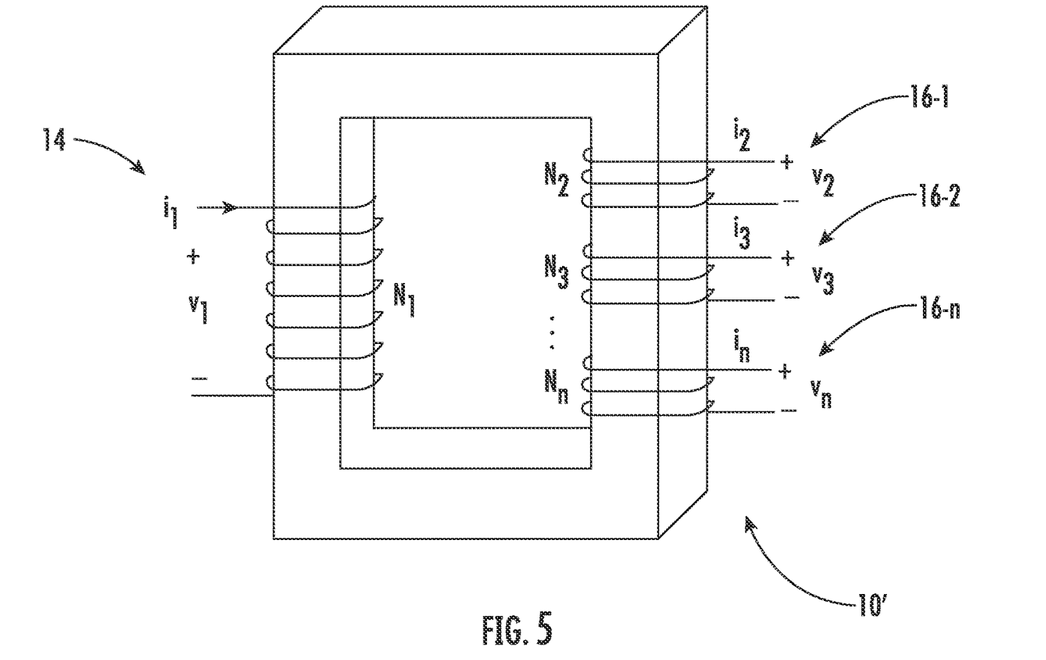
FIG. 5 illustrates a multi-winding transformer.
Figure 6:
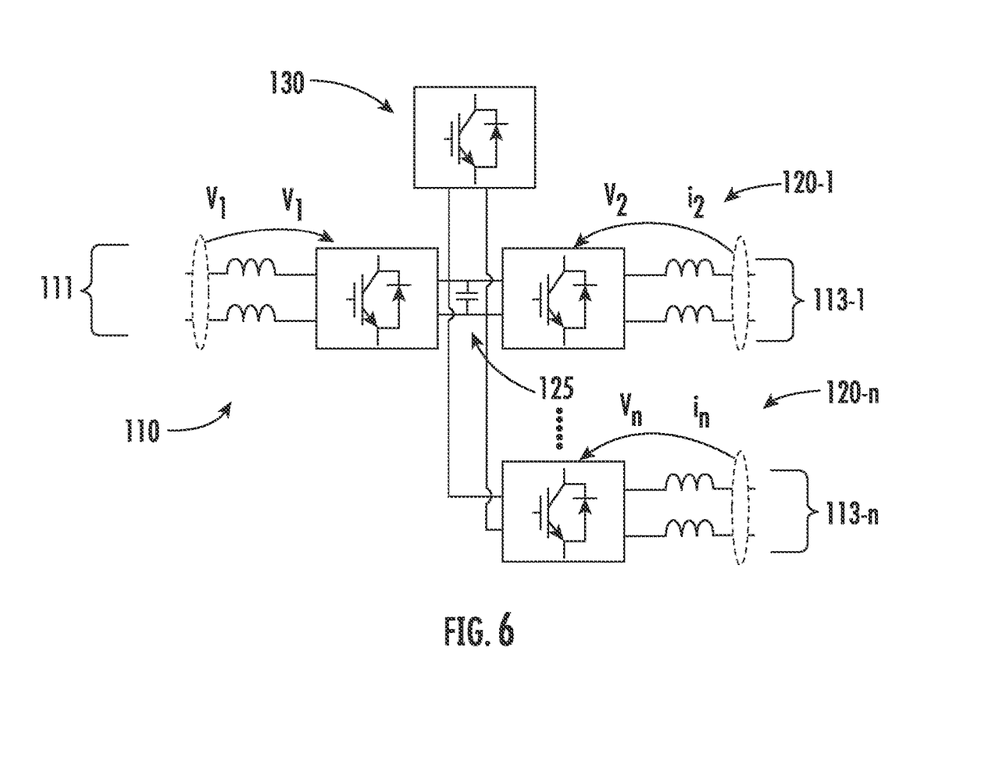
FIG. 6 is a schematic diagram illustrating a power electronics converter based transformer emulator circuit for emulating the transformer of FIG. 5 according to some embodiments.

According to further embodiments, power electronics converter based emulators along the lines of that illustrated in FIG. 2 may also be used to emulate transformers with multiple windings. For example, FIG. 6 illustrates an emulator that could be used to emulate a transformer 10' in FIG. 5 with multiple secondary windings 16-1, 16-2, ..., 16-n with respective turns $N_2$, $N_3$, ... $N_n$. The transformer emulator of FIG. 6 includes a first power electronics converter circuit 110 and multiple second power electronics converter circuits 120-1, ..., 120-n coupled by a DC bus 125. The first and multiple second power electronics converter circuits 110, 120-1, ..., 120-n are operated to emulate the respective voltage transformations $v_2/v_1$, $v_3/v_1$, ..., $v_n/v_1$ between the first port 14 of the transformer 10' and respective ones of second ports 16-1, 16-2, ..., 16-n, e.g., such that the voltage transformations $v_2/v_1$, ..., $v_n/v_1$ between the first port 111 of the emulator and respective ones of second ports 113-1, ..., 113-n of the emulator is substantially the same as that provided by the transformer 10'. Along the lines described above with reference to FIG. 4, the voltages of the ports 111, 113-1, ..., 113-n can be provided to a multi-winding transformer model, which estimates current and voltage references for controlling the first power electronics converter 110 and the second power electronics converters 120-1, ..., 120-n, respectively. The third power electronics converter 130 is controlled to regulate the voltage on the DC bus 125 voltage to provide loss emulation.

Figure 7:
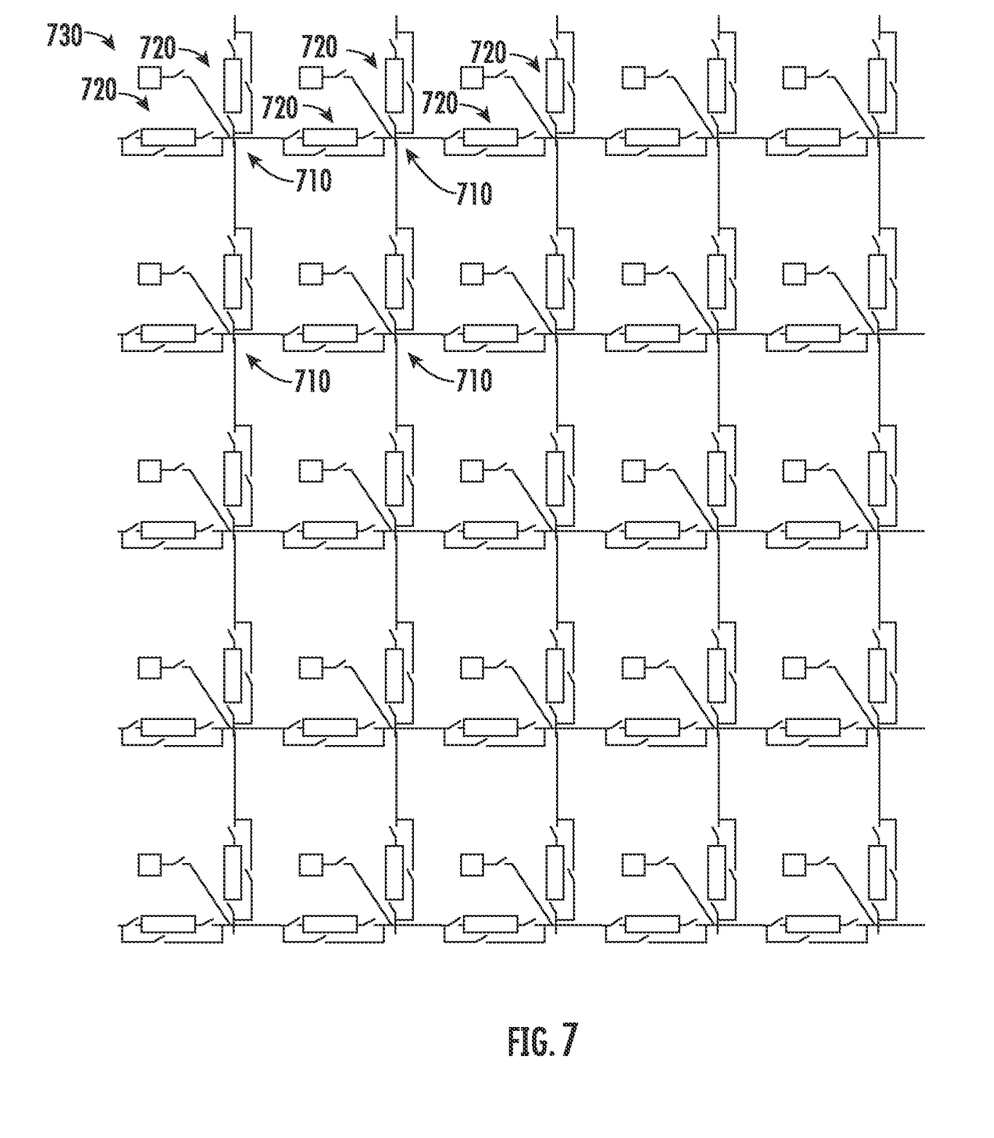
FIG. 7 illustrates an emulator apparatus which utilizes transformer emulator circuits along the lines illustrated in FIG. 2 according to further embodiments.

According to further embodiments, emulator circuit along the lines described above may be used in a flexible, scalable emulator architecture that can be used to emulate a variety of different power systems. FIG. 7 illustrates such an apparatus, including transmission path emulator circuits 720 that are configured to be selectively connected between adjacent nodes 710 of a two-dimensional array, and load/source emulator circuits 730 configured to be selectively coupled to respective ones of the nodes 710. Such an arrangement is described in a co-pending U.S. patent application Ser. No. 17/150,650 entitled "SCALABLE AND RECONFIGURABLE APPARATUS AND METHODS FOR ELECTRIC POWER SYSTEM EMULATION", filed concurrently herewith and incorporated herein by reference in its entirety. As explained therein, the transmission path emulator circuits 720 may be operated to emulate power system transmission components such as transmission lines and transformers.

Figure 8:
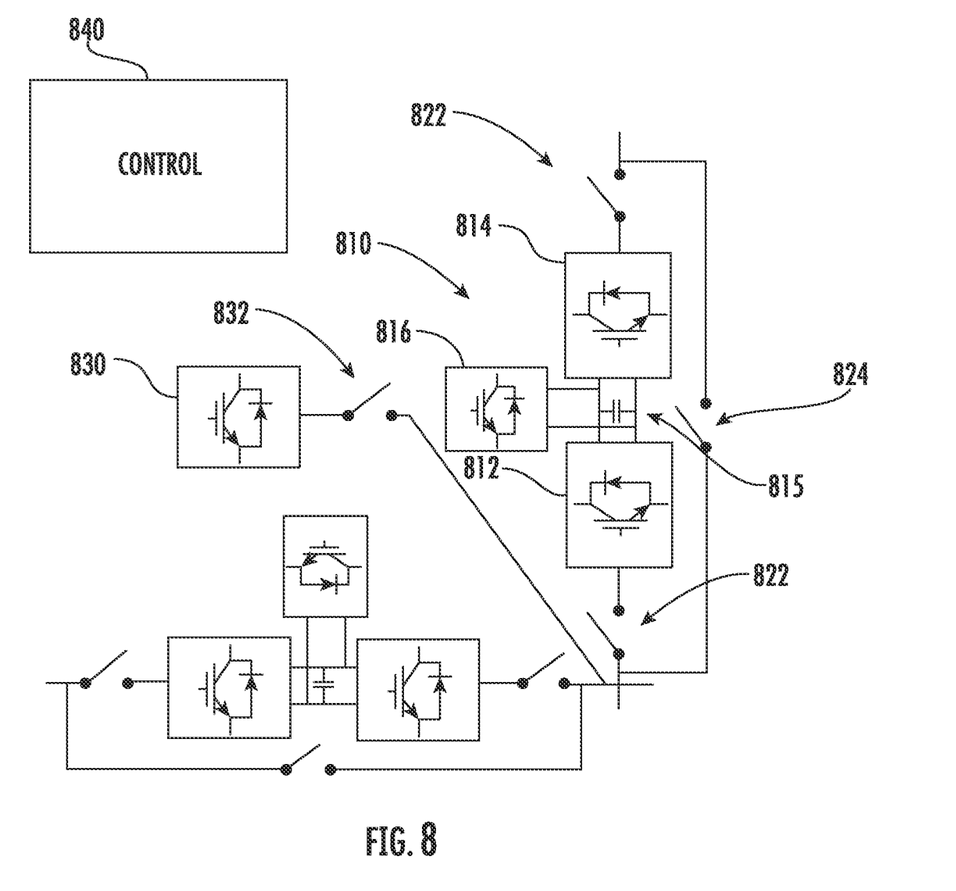
FIG. 8 illustrates a portion of the emulator apparatus of FIG. 7.

As shown in detail in FIG. 8, one or more of the transmission path emulator circuits 720 may comprise power electronics converter based emulator circuits 810 along the lines discussed above. The emulator circuits 810 may comprise first, second and third power electronics converter circuits 812, 814, 816 interconnected by a DC bus 815. The power electronics converter circuits 812, 814, 816 may be operated to emulate a transformer as discussed above. As further explained in the aforementioned U.S. patent application Ser. No. 17/150,650 entitled "SCAL-ABLE AND RECONFIGURABLE APPARATUS AND METHODS FOR ELECTRIC POWER SYSTEM EMULATION", the emulator circuits 810 may also be operated to emulate a transmission line.

The drawings and specification, there have been disclosed exemplary embodiments of the inventive subject matter. Although specific terms are employed, they are used in a generic and descriptive sense only and not for purposes of limitation, the scope of the inventive subject matter being defined by the following claims.

That which is claimed:

1. A transformer emulator comprising:
   a DC bus;
   first power electronics converter circuit having a DC port coupled to the DC bus;
   a second power electronics converter circuit having a DC port coupled to the DC bus;
   a third power electronics converter circuit having DC port coupled to the DC bus; and
   a control circuit configured to control the first, second and third power electronics converter circuits to emulate a transformer having a first port corresponding to an AC port of the first power electronics converter circuit and a second port corresponding to an AC port of the second power electronics converter circuit.

2. The transformer emulator of claim 1, wherein the control circuit is configured to control the first and second power electronics converter circuits to emulate a voltage transformation of the transformer and to control the third power electronics converter circuit to emulate a loss of the transformer.

3. The transformer emulator of claim 1, wherein the first and second power converters comprise respective voltage source converters (VSCs).

4. The transformer emulator of claim 1, wherein the control circuit comprises:
   a transformer model that generates a current reference for the first power electronics converter and a voltage reference for the second power electronics converter;
   a current tracker that tracks the current reference for the first power electronics converter;
   a voltage tracker that tracks the voltage reference for the second power electronics converter; and
   a voltage tracker that tracks a DC voltage reference for the third power electronics converter.

5. The transformer emulator of claim 1, wherein the first and second power electronics converter circuits comprise respective single-phase power electronics converter circuits or respective multi-phase power electronics converter circuits.

6. The transformer emulator of claim 1, wherein each of the first and second power electronics converter circuits comprises:
   a plurality of transistors configured for converting AC power to DC power or DC power to AC power or both.

7. The transformer emulator of claim 1, wherein the second power electronics converter circuit comprises a plurality of second power electronics converter circuits and wherein the control circuit is configured to control the first power electronics converter circuit, plurality of second power electronics converter circuits and the third power electronics converter circuit to emulate a transformer having a first port corresponding to an AC port of the first power electronics converter circuit and a plurality of ports corresponding to the AC ports of the plurality of second power electronics converter circuits.

8. The transformer emulator of claim 7, wherein the control circuit is configured to control the first power electronics converter circuit, the plurality of second power electronics converter circuits to emulate voltage transformations of the transformer and to control the third power electronics converter circuit to emulate a loss of the transformer.

9. The transformer emulator of claim 7, wherein the first power electronics converter, the plurality of second power electronics converters and the third power electronics converter comprise respective voltage source converters (VSC).

10. A power system emulator comprising an array of nodes and a plurality of emulator circuits, respective ones of which are configured to be selectively connected between adjacent ones of the nodes in first and second dimensions, the emulator circuits comprising the transformer emulator according to claim 1 configured to be selectively coupled between first and second ones of the nodes.

11. A method of emulating a transformer comprising:
coupling first, second and third power electronics converter circuits to a DC bus; and
controlling the first, second and third power electronics converter circuits to emulate a transformer having a first port corresponding to an AC port of the first power electronics converter circuit and a second port corresponding to an AC port of the second power electronics converter circuit.

12. The method of claim 11, wherein controlling the first, second and third power electronics converter circuits to emulate a transformer having a first port corresponding to an AC port of the first power electronics converter circuit and a second port corresponding to an AC port of the second power electronics converter circuit, comprises controlling the first and second power electronics converter circuits to emulate a voltage transformation of the transformer and controlling the third power electronics converter circuit to emulate a loss of the transformer.

13. The method of claim 11, wherein the first and second power electronics converters comprise respective voltage source converters (VSCs).

14. The method of claim 11, wherein controlling the first, second and third power electronics converter circuits to emulate a transformer having a first port corresponding to an AC port of the first power electronics converter circuit and a second port corresponding to an AC port of the second power electronics converter circuit comprises:
using a transformer model to generate a current reference for the first power electronics converter and a voltage reference for the second power electronics converter;
using a current tracker to track the current reference for the first power electronics converter;
a voltage tracker to track the voltage reference for the second power electronics converter; and
a voltage tracker to track a DC voltage reference for the third power electronics converter.

15. The method of claim 11, wherein the first and second power electronics converter circuits comprise respective single-phase power converter circuits or respective multi-phase power electronics converter circuits.

16. The method of claim 11, wherein each of the first and second power electronics converter circuits comprises a plurality of transistors configured for converting AC power to DC power or DC power to AC power or both.

17. The method of claim 11, wherein the second power electronics converter circuit comprises a plurality of second power electronics converter circuits and wherein controlling the first, second and third power electronics converter circuits to emulate a transformer having a first port corresponding to an AC port of the first power electronics converter circuit and a second port corresponding to an AC port of the second power electronics converter circuit comprises controlling the first power electronics converter circuit, the plurality of second power electronics converter circuits and the third power electronics converter circuit to emulate a transformer having a first port corresponding to an AC port of the first power electronics converter circuit and a plurality of ports corresponding to the AC ports of the plurality of second power electronics converter circuits.

18. The method of claim 17, wherein controlling the first power electronics converter circuit, the plurality of second power electronics converter circuits and the third power electronics converter circuit to emulate a transformer having a first port corresponding to an AC port of the first power electronics converter circuit and a plurality of ports corresponding to the AC ports of the plurality of second power electronics converter circuits comprises controlling the first power electronics converter circuit, the plurality of second power electronics converter circuits to emulate voltage transformations of the transformer and to control the third power electronics converter circuit to emulate a loss of the transformer.

19. The method of claim 17, wherein the first power electronic converter, the plurality of second power electronics converters and the third power electronics converter comprise respective voltage source converters (VSCs).

* * * * *